United States Patent [19]

Stone et al.

[11] Patent Number: 4,511,545

[45] Date of Patent: Apr. 16, 1985

[54] PROCESS FOR TREATING OVERSPRAY GAS FROM GLASS COATING OPERATION WITH METAL RECOVERY

[75] Inventors: Carroll E. Stone, San Marino; William F. C. Seifert, Lakewood, both of Calif.

[73] Assignee: American Engineering Group International, Inc., Vernon, Calif.

[21] Appl. No.: 493,362

[22] Filed: May 10, 1983

[51] Int. Cl.³ ............................................. B01D 53/34
[52] U.S. Cl. .................................... 423/240; 423/481; 423/612; 423/618; 65/30.1
[58] Field of Search ............... 423/240 R, 240 S, 481, 423/612, 618; 65/30.1, 60.51

[56] References Cited

U.S. PATENT DOCUMENTS

| | | | |
|---|---|---|---|
| 2,346,604 | 4/1944 | Pechukas | 423/240 R |
| 2,732,310 | 1/1956 | Miller | 423/612 |
| 3,256,062 | 6/1966 | Wylegala | 423/240 R |
| 3,561,940 | 2/1971 | Scholes | 65/30.1 |
| 3,789,109 | 1/1974 | Lyon et al. | 423/481 |
| 3,919,391 | 11/1975 | Scholes et al. | 423/240 R |
| 3,956,532 | 5/1976 | Russell | 423/240 R |
| 4,325,922 | 4/1982 | Bryant | 423/240 |

Primary Examiner—L. Dewayne Rutledge
Assistant Examiner—Christopher W. Brody
Attorney, Agent, or Firm—Lyon & Lyon

[57] ABSTRACT

The process and apparatus for removing metal halide gases from overspray generated during hot-end glass coating operations is disclosed. The excess metal halide gas is drawn into a recovery chamber in which it is decomposed to a metal oxide and a hydrogen halide gas by reaction with a warm water spray. The hydrogen halide gas is then subjected toa cold water spray to reduce the hydrogen halide gas to an acid which is diluted and discarded as an effluent. The treated overspray gas which is finally discarded to the environment contains substantially no metal halides and only a minimal concentration of hydrogen halide gas.

10 Claims, 3 Drawing Figures

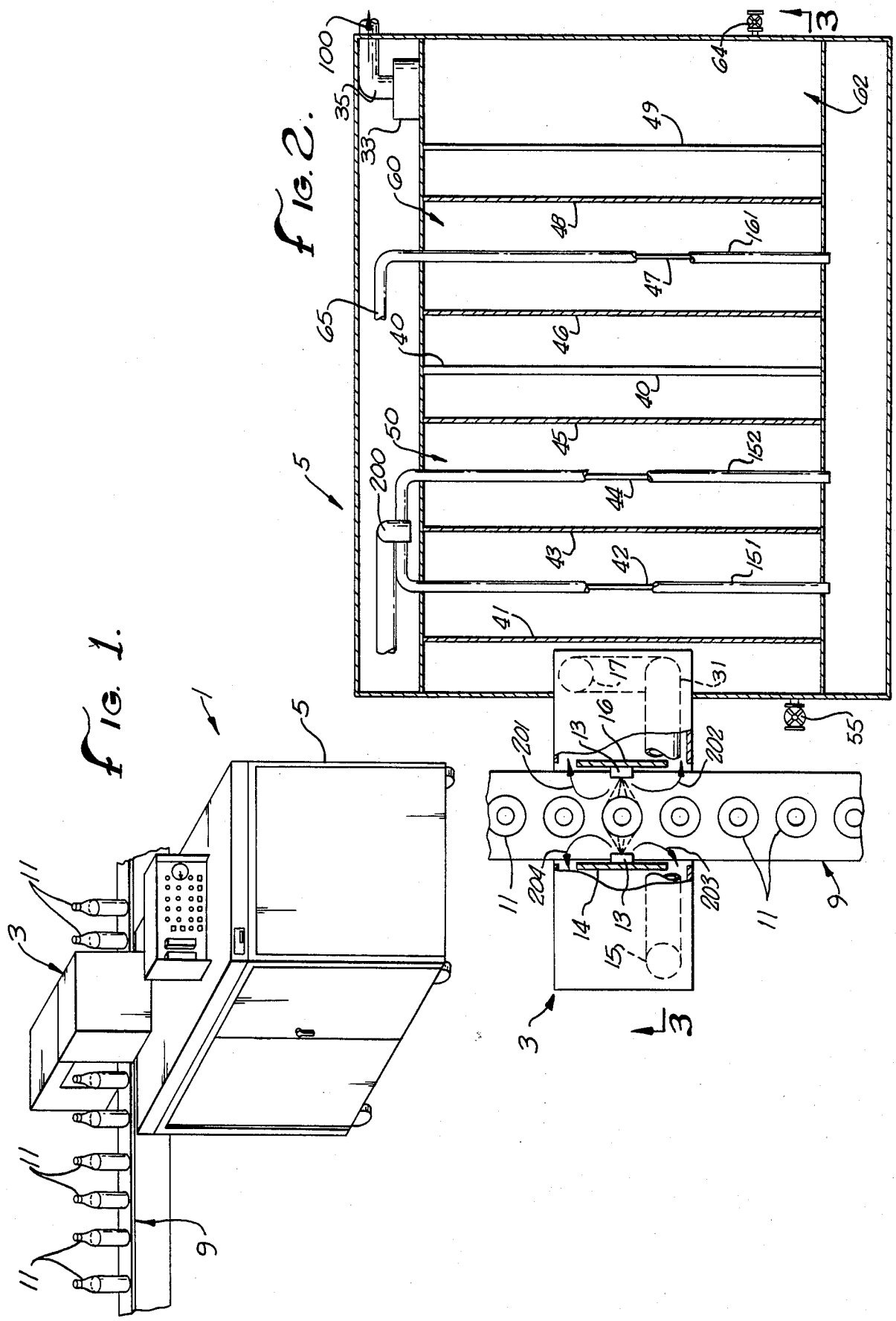

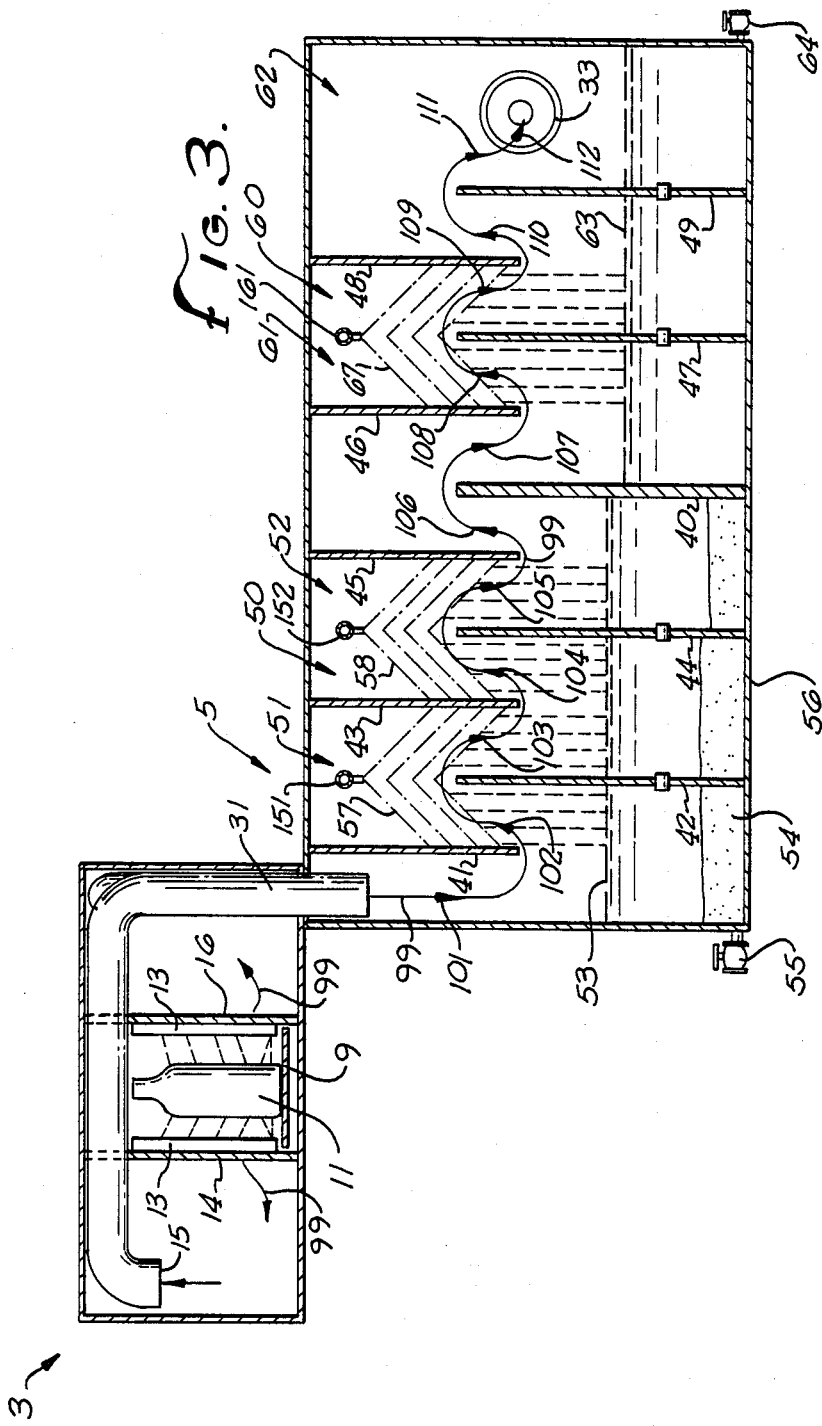

PROCESS FOR TREATING OVERSPRAY GAS FROM GLASS COATING OPERATION WITH METAL RECOVERY

BACKGROUND OF THE INVENTION

1. Field of the Invention

The field of the present invention relates generally to coating apparatus and processes employing pollution abatement techniques to recover excess metals in a reusable form.

2. Description of the Prior Art

Glass surfaces are found in a multitude of objects, including glass containers and bottles. However, when freshly formed glass surfaces are moved over one another at the slightest contact pressure, visible abrasions will be formed. Since it has long been recognized that abrasions reduce the potential strength of a glass container, and glass containers are handled in filling lines at very high rates in conditions where the glass containers will often come into contact with each other, glass manufacturers have sought means to protect glass surfaces.

It has been found that glass may advantageously be coated utilizing hot-end coating operations between a glass forming machine and a lehr in which the formed glass is annealed. In such a process, a metal oxide coating is formed on the hot glass surface. In particular, it has been found that metal oxide coatings are useful in preventing abrasions.

Metal oxide coatings may be formed during hot-end coating operations by treating hot glass surfaces with metal halides. Thus, by way of example only, stannic chloride vapor has been utilized in such operations, as is more fully described in U.S. Pat. No. 3,561,940. However, conventional coating operations require an excess or overspray of the coating material in order to achieve a desired coating thickness. The amount of overspray will not only affect the cost of the materials needed to coat a given quantity of glass objects, but it will also contribute to the amount of gaseous coating materials which are introduced into the environment surrounding the coating apparatus.

It is suspected that gaseous metallic halide particles pose a health hazard to industrial workers who are continually exposed to relatively low levels of these coating materials over a long period of time. Metallic halide compounds will decompose to form a strong acid or a hydrogen halide gas as well as a metallic oxide upon contact with moisture or heat. Thus, metallic halides pose health risks not only due to their metallic content, but also due to their corrosive properties. Additionally, the same corrosive properties which pose health hazards will also lead to property damage and environmental concerns if the metallic halides are not removed from overspray generated in the coating process.

Despite the above-noted problems, conventional apparatus and methods of coating have taken few preventive measures to reduce the amount of overspray which is discharged outside of the coating apparatus. As an example, previous methods of coating have often relied upon elevated exhaust ducts to reduce the concentration of excess coating vapors released to the environment. Such exhaust ducts create an elevated plume which is eventually distributed over a large area. While such devices decrease the concentration of metallic coating materials which are found in a small unit of surrounding air, such as a cubic meter, the metallic coating materials are still emitted to the environment. Thus, there exists a need for an effective means for removing metallic coating materials from an overspray discharge which is generated during hot-end metallic glass coating operations.

SUMMARY OF THE INVENTION

In the present invention, metal halide sprays are subjected to a treatment process in which the metallic halides are washed with a hot water spray to precipitate the metal in the context of glass surface coating processes. In another aspect of the present invention, the gaseous by-products, generated by the decomposition of the metal halides during the hot water wash, are treated with a cold water spray.

When a glass surface is coated in accordance with the present invention, substantially all of the metal not utilized to form a coating on the glass is recovered as a recycleable by-product, thereby reducing the cost of coating a glass surface. Additionally, the discharge of gaseous metal halides into the environment is greatly reduced. The reduction of metal halide discharge reduces property and environmental damage caused by the corrosive nature of such compounds. Additionally, health hazards associated with the constant exposure of workers in a glass coating plant to background levels of gaseous metal halides are greatly reduced.

When a cold water wash is utilized in accordance with the present invention, the by-products of the decomposition of metal halides may be safely discarded. Thus, metal halides are treated without generating hazardous wastes which are expensive to safely dispose. Also, since the by-products are not precipitated by the hot water wash or solubilized in the hot water, the hot water may be continually recycled in a closed system.

Accordingly, it is a primary object of the present invention to provide an apparatus and process for treating a gas containing a metal halide.

This and further objects and advantages will be apparent to those skilled in the art in connection with the drawings and the detailed description of the preferred embodiment set forth below.

BRIEF DESCRIPTION OF THE DRAWINGS

FIG. 1 is an environmental view of the preferred embodiment of an apparatus according to the present invention;

FIG. 2 is a partial cut-away top view of FIG. 1; and

FIG. 3 is a cross section taken along line 3—3 of FIG. 2.

DETAILED DESCRIPTION OF THE PREFERRED EMBODIMENT

The preferred embodiment of a coating apparatus according to the present invention, generally designated as 1, is depicted in FIG. 1. The coating apparatus 1 consists of a coating chamber which also serves as an overspray collector, generally designated as 3, a recovery chamber, generally designated as 5, and a conveyor, generally designated as 9.

As shown in FIG. 2, the conveyor 9 moves through coating chamber 3 carrying glass objects 11. While glass objects 11 have been depicted as bottles, any object having a glass surface may be treated in a similar fashion.

The coating chamber 3 has two moveable walls, 14 and 16, which are substantially parallel to the path the objects 11 pass through the coating chamber 3 on the conveyor 9. The walls 14 and 16 may be moved in a direction perpendicular to the conveyor 9 so as to adjust the distance between the objects 11 being coated and the nozzles 13 which are affixed to the walls 14 and 16. As shown in FIGS. 2 and 3, five nozzles are vertically aligned in the center of the walls 14 and 16. The tips of the nozzles are a distance of approximately one inch from the glass surface to be coated. A duct 15 is located behind wall 14 relative to the conveyor 9 while a duct 17 is located behind wall 16 relative to the conveyor 9. The ducts 15 and 17 are located on opposite sides of a plane which may formed through the centers of the nozzles 13. The ducts 15 and 17 are connected to a central duct 31 which forms an overspray gas inlet leading into recovery chamber 5. Alternatively, each duct 15 and 17 could lead into the recovery chamber 5.

The recovery chamber is divided into a hot spray compartment, generally designated as 50, and a cold spray compartment, generally designated as 60, by a passage formed above insulator 40. Baffles 41, 42, 43, 44 and 45 divide the hot spray compartment 50 into a first hot spray zone, generally designated as 51, and a second hot spray zone, generally designated as 52, while baffles 46, 47 and 48 divide the cold spray compartment 60 into a cold spray zone, generally designated as 61, and a discharge zone, generally designated as 62. An additional baffle 49 is provided in the discharge zone 62 to help control the exit velocity, as well as to decrease the hydrogen halide content of the discharge 100 through exhaust duct 35, all of which will be described in greater detail below.

A first set of hot water spray nozzles 151 produce a hot water spray 57 in the first hot spray zone 51 while a second set of hot water spray nozzles 152 produce a hot water spray 58 in the second hot spray zone 52. The hot water 53 is recirculated through spray nozzles 151 and 152 and maintained at an elevated temperature through a closed recirculation system 200 which supplies the spray nozzles with a source of hot water.

The design of a recirculation system, which may include a make-up water source, a heater, pumps and the like, is deemed to be well within the capability of one skilled in the art. Therefore, a detailed description of such a system has been omitted so as to facilitate an understanding of the novel aspects of the present invention. Additionally, while the hot spray compartment 50 has been described as having a first spray zone 51 and a second spray zone 52, the design of such spray zones may be modified so long as a sufficient spray zone is attained in which substantially all of the metal halide is decomposed. In a similar manner, while both the first and the second set of hot water spray nozzles 151 and 152 form a hot water sprayer, the design of such a hot water sprayer may be modified without departing from the scope of the present invention.

A set of cold water spray nozzles 161 form a cold sprayer which produces a cold water spray 67 in the cold spray zone 61. The cold water spray 67 is collected in a cold water effluent 63, which is removed from the recovery chamber 5 by drain 64. Fresh cold water is supplied to the cold water spray nozzles by a pipe 65 which may be directly connected to an incoming source of water supplied by a municipal water service.

During operation of the coating apparatus 1, the conveyor 9 carries objects 11 through coating chamber 3. The nozzles 13 spray a gaseous metal halide toward the objects 11, and the metal halide is dispersed over the glass surface of the objects 11 to produce a relatively uniform layer of the desired thickness. The excess metal halide spray is drawn into ducts 15 and 17 around walls 14 and 16, as shown by arrows 201 through 204 in FIG. 2.

As the overspray is drawn into the recovery chamber 5 by a circulation means such as a partial vacuum, it initially follows a gas circulation path shown by arrows 101 and 102, shown in FIG. 3, so that it passes between baffle 41 and hot water 53. It then enters the first hot spray zone 51. When the overspray passes through hot water spray 57, the metal halide is reacted to precipitate a metal oxide and liberate a gaseous hydrogen halide. The metal oxide forms a slurry 54 at the bottom 56 of hot spray compartment 50 which functions as a water collector. As the overspray continues to pass through hot spray compartment 50, as shown by arrows 103 to 105, substantially all of the metal present in the overspray is removed after contact with hot water sprays 57 and 58. When a sufficient amount of slurry 54 has been collected, the slurry may be withdrawn from the recovery chamber 5 by slurry drain 55.

After the metal has been removed from the overspray, the hydrogen halide vapor follows the path shown by arrows 106 and 107 to enter cold spray compartment 60. As this gas passes between baffles 46, 47 and 48, most of the gaseous hydrogen halide reacts with the cold water spray 69 to form an acid which is collected and diluted in the cold water effluent 63. The treated overspray is then drawn into fan 33 and blown out exhaust duct 35 as discharge stream 100.

The path travelled by gas drawn into ducts 15 and 17 by a circulation means is shown by arrows 101 through 112. Although the path shown in FIG. 3 is sinusoidal, the length of the baffles 41 through 49 can be varied to alter the velocity of the gas traveling through these paths. Such alteration may also be used to vary the paths depicted by arrows 101 through 111. However, it has been found advantageous that the lengths of the baffles 41 through 49 be sufficient so as to force the travelling gas to go underneath baffles 41, 43, 45, 46 and 48 while going over baffles 42, 44, 47, 49 and insulator 40.

The invention will be further illustrated in the example that follows wherein stannic chloride, a compound consisting of tin and chlorine with the molecular formula $SnCl_4$, has been chosen as a metal halide. While most glass coating processes today use $SnCl_4$ because of its low cost, the present invention is also applicable to other metal halides used to coat glass surfaces, including titanium tetrachloride, another commercial coating material now in use.

When the glass object 11 leaves a glass forming machine, the temperature of the glass entering the coating apparatus is between 900° to 1500° F., preferably within the 950° to 1000° F. range. As the $SnCl_4$ is sprayed onto the glass, the $SnCl_4$ penetrates the glass structure to form a layer of tin oxide. The overspray, which has been found to contain up to 50% of the $SnCl_4$ sprayed, is then drawn into the hot water sprays 57 and 58 which are maintained at a temperature greater than approximately 160°. The $SnCl_4$ is decomposed to form a tin oxide slurry and hydrogen chloride gas. Due to the temperatures in the hot spray compartment 50, very little hydrogen chloride gas is converted to hydrochloric acid. The hydrogen chloride gas is then subjected to a cold water spray 67 which is at a temperature less than approximately 90° F. The resultant cold water effluent 63 discharged from the system is at a pH of 6.3 with a tin concentration less than 0.0002 milligrams per milliliter. The hydrogen chloride gas concentration in the exhaust 100 is less than 5.0 parts per million. The airborne tin concentration outside of the apparatus is less than 1.0 milligrams per cubic meter.

Having fully described the present invention, it will be apparent from the above description and drawings that various modifications in the specific compositions, procedures and apparatus described may be made within the scope of the invention. Therefore, the invention is not intended to be limited to the particular designs, procedures and formulations except as may be required by the lawful scope of the following claims.

What is claimed is:

1. A process for treating an overspray gas generated during a hot-end glass coating operation utilizing a metal halide, said process comprising the steps of:
    collecting the overspray gas;
    passing the overspray gas to a hot spray compartment;
    spraying the overspray gas with a hot water spray to decompose the metal halide to a metal precipitate and a hydrogen halide gas;
    collecting the metal precipitate and the hot water spray in a warm water collector;
    passing the hydrogen halide gas and the overspray gas to a cold spray compartment;
    spraying the hydrogen halide gas and the overspray gas with a cold water spray to form an acid;
    diluting the acid to form a cold water effluent; and
    discharging the overspray gas from the cold spray compartment.

2. A process as recited in claim 1, wherein the hot water is at a temperature greater than 160° F.

3. A process as recited in claim 1, wherein the cold water spray is at a temperature less than 90° F.

4. A process as recited in claim 1, wherein the metal halide comprises stannic chloride.

5. A process as recited in claim 4, wherein the overspray gas discharged from the cold spray compartment has a concentration of hydrogen chloride gas which is lower than 5.0 parts per million.

6. A process as recited in claim 4, wherein the cold water effluent discharged from the cold spray compartment has a pH above 6.0.

7. A process as recited in claim 4, wherein the metal precipitate is a tin oxide.

8. A process as recited in claim 1, wherein the metal halide comprises titanium tetrachloride.

9. A process as recited in claim 1, wherein the metal precipitate forms a slurry in the hot water collector.

10. A process as recited in claim 1, further comprising the steps of:
    discharging the cold water effluent from the cold spray compartment; and
    recycling the hot water in the hot water collector to the hot water spray.

* * * * *